US011172513B2

(12) United States Patent
Zhou et al.

(10) Patent No.: US 11,172,513 B2
(45) Date of Patent: Nov. 9, 2021

(54) CONFIGURING TRANSMISSION CONFIGURATION INDICATION STATES ON AN INITIAL CONTROL RESOURCE SET

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 16/680,426

(22) Filed: Nov. 11, 2019

(65) Prior Publication Data

US 2020/0154489 A1 May 14, 2020

Related U.S. Application Data

(60) Provisional application No. 62/760,879, filed on Nov. 13, 2018, provisional application No. 62/760,034, filed on Nov. 12, 2018.

(51) Int. Cl.
*H04W 4/00* (2018.01)
*H04W 74/08* (2009.01)
(Continued)

(52) U.S. Cl.
CPC ....... *H04W 74/0833* (2013.01); *H04L 5/0048* (2013.01); *H04W 56/001* (2013.01); *H04W 72/042* (2013.01)

(58) Field of Classification Search
CPC .......... H04W 74/0833; H04W 56/001; H04W 72/042; H04L 5/0048
(Continued)

(56) References Cited

U.S. PATENT DOCUMENTS

2018/0337757 A1* 11/2018 Noh ...................... H04L 5/0048
2019/0356524 A1* 11/2019 Yi .......................... H04L 5/0094
(Continued)

OTHER PUBLICATIONS

Ericsson (R1-1809864, "Feature lead summary for beam management—Thursday", Gothenburg, Aug. 20-20, 2018) (Year: 2018).*
(Continued)

*Primary Examiner* — Maharishi V Khirodhar
(74) *Attorney, Agent, or Firm* — Holland & Hart LLP

(57) ABSTRACT

Methods, systems, and devices for wireless communication are described. Generally, the described techniques provide for efficiently identifying spatial parameters for receiving control information in an initial coreset. In one example, a user equipment (UE) may receive a TCI state indicating reference signals quasi co-located with a control information transmission in a coreset, and the UE may also identify a quasi co-location (QCL) assumption in a random-access procedure indicating that a synchronization signal block (SSB) is quasi co-located with the control information transmission in the coreset. In this example, the UE may identify spatial parameters for monitoring the coreset for the control information transmission in accordance with the TCI state or the QCL assumption based on the timing of the indicated TCI state and the QCL assumption.

28 Claims, 13 Drawing Sheets

(51) Int. Cl.
*H04L 5/00* (2006.01)
*H04W 56/00* (2009.01)
*H04W 72/04* (2009.01)

(58) Field of Classification Search
USPC .......................................................... 370/329
See application file for complete search history.

(56) References Cited

U.S. PATENT DOCUMENTS

2020/0374036 A1* 11/2020 Seo ..................... H04L 27/2649
2021/0076324 A1* 3/2021 Kaikkonen ........... H04W 24/08

OTHER PUBLICATIONS

NTT DOCOMO (R1-1809138, "remaining issues on beam management", Gothenburg, Sweden, Aug. 20-24, 2018 (Year: 2018).*
Ericsson: "Feature Lead Summary for Beam Management—Thursday", 3GPP Draft, 3GPP TSG-RAN WG1 Meeting #94, R1-1809864 Feature Lead Summary Beam Management—Thursday, 3rd Generation Partnership Project (3GPP), Mobile Competence Centre, 650, Route Des Lucioles, F-06921 Sophia-Antipolis Cedex, vol. RAN WG1, No. Gothenburg, Aug. 20, 2018-Aug. 24, 2018, Aug. 23, 2018 (Aug. 23, 2018), XP051517219, 26 Pages, Retrieved from the Internet: URL:http://www.3gpp.org/ftp/tsg%5Fran/WG1%5FRL1/TSGR1%5F94/Docs/R1%2D1809864%2Ezip [retrieved on Aug. 23, 2018] Section 2.6, section 3.4, section 3.4.1.
International Search Report and Written Opinion—PCT/US2019/061024—ISA/EPO—dated Apr. 6, 2020.
Nokia, et al., "Remaining Details on QCL", 3GPP Draft, 3GPP TSG RAN WG1 Meeting #90bis, R1-1718769, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Oct. 9, 2017-Oct. 13, 2017, Oct. 9, 2017 (Oct. 9, 2017), XP051353281, 6 pages, Retrieved from the Internet: URL: http://www.3gpp.org/ftp/tsg_ran/WG1_RL1/TSGR1_90b/Docs/—[retrieved on Oct. 9, 2017], section 2.2.

* cited by examiner

CONFIGURING TRANSMISSION CONFIGURATION INDICATION STATES ON AN INITIAL CONTROL RESOURCE SET

CROSS REFERENCE

The present application for patent claims the benefit of U.S. Provisional Patent Application No. 62/760,034 by ZHOU, et al., entitled "CONFIGURATION OF TRANSMISSION CONFIGURATION INDICATOR (TCI) STATES FOR CONTROL RESOURCE SET (CORESET) INITIAL DOWNLINK BANDWIDTH PART (DL BWP)," filed Nov. 12, 2018, and to U.S. Provisional Patent Application No. 62/760,879 by ZHOU, et al., entitled, "CONFIGURING TRANSMISSION CONFIGURATION INDICATION STATES ON AN INITIAL CONTROL RESOURCE SET" filed Nov. 13, 2018, assigned to the assignee hereof, which is hereby incorporated by reference in its entirety.

BACKGROUND

The following relates generally to wireless communications and more specifically to configuring transmission configuration indication (TCI) states on an initial control resource set (coreset).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a base station and a UE may exchange control information and data on one or more beams. In some cases, it may be appropriate for a UE to identify appropriate spatial parameters for receiving control information (e.g., in an initial coreset) from a base station. Conventional techniques for identifying appropriate spatial parameters for receiving control information from a base station may be deficient.

SUMMARY

The described techniques relate to improved methods, systems, devices, and apparatuses that support configuring transmission configuration indication (TCI) states on an initial control resource set (coreset). Generally, the described techniques provide for efficiently identifying spatial parameters for receiving control information in an initial coreset. A user equipment (UE) may receive a TCI state indicating reference signals quasi co-located with a control information transmission in the initial coreset, and the UE may also identify a quasi co-location (QCL) assumption in a random-access procedure indicating that a synchronization signal block (SSB) is quasi co-located with the control information transmission in the initial coreset. The UE may then identify spatial parameters for monitoring the initial coreset for the control information transmission in accordance with the TCI state or the QCL assumption based on the timing of the indicated TCI state and the QCL assumption.

A method of wireless communication by a UE is described. The method may include receiving signaling indicating a TCI state corresponding to an initial coreset, identifying a QCL assumption associated with an SSB selected in a random-access procedure, determining spatial parameters for monitoring the initial coreset for control information using the indicated TCI state or the identified QCL assumption based on whether a first time at which the indicated TCI state is to be applied is more recent than a second time at which the identified QCL assumption is to be applied, and monitoring the coreset based on the determined spatial parameters.

An apparatus for wireless communication by a UE is described. The apparatus may include a processor, memory in electronic communication with the processor, and instructions stored in the memory. The instructions may be executable by the processor to cause the apparatus to receive signaling indicating a TCI state corresponding to an initial coreset, identify a QCL assumption associated with an SSB selected in a random-access procedure, determine spatial parameters for monitoring the initial coreset for control information using the indicated TCI state or the identified QCL assumption based on whether a first time at which the indicated TCI state is to be applied is more recent than a second time at which the identified QCL assumption is to be applied, and monitor the coreset based on the determined spatial parameters.

Another apparatus for wireless communication by a UE is described. The apparatus may include means for receiving signaling indicating a TCI state corresponding to an initial coreset, identifying a QCL assumption associated with an SSB selected in a random-access procedure, determining spatial parameters for monitoring the initial coreset for control information using the indicated TCI state or the identified QCL assumption based on whether a first time at which the indicated TCI state is to be applied is more recent than a second time at which the identified QCL assumption is to be applied, and monitoring the coreset based on the determined spatial parameters.

A non-transitory computer-readable medium storing code for wireless communication by a UE is described. The code may include instructions executable by a processor to receive signaling indicating a transmission configuration indication (TCI) state corresponding to an initial coreset, identify a QCL assumption associated with an SSB selected in a random-access procedure, determine spatial parameters for monitoring the initial coreset for control information using the indicated TCI state or the identified QCL assumption based on whether a first time at which the indicated TCI state is to be applied is more recent than a second time at which the identified QCL assumption is to be applied, and monitor the coreset based on the determined spatial parameters.

In some examples of the method, apparatuses, and non-transitory computer-readable medium described herein, the TCI state indicates a configuration of first and second reference signals that may have a QCL relationship and a QCL type associated with the SSB. In some examples of the method, apparatuses, and non-transitory computer-readable medium described herein, receiving the signaling further may include operations, features, means, or instructions for identifying that an SSB index of the SSB corresponds to a first control channel monitoring occasion of a set of control channel monitoring occasions, and monitoring a common search space of the first control channel monitoring occasion for the control information.

In some examples of the method, apparatuses, and non-transitory computer-readable medium described herein, the SSB may have a QCL relationship with a reference signal of the indicated TCI state. In some examples of the method, apparatuses, and non-transitory computer-readable medium described herein, the SSB may be selected through the random-access procedure not triggered by a physical downlink control channel (PDCCH) order that triggers a non-contention based random-access procedure. Some examples of the method, apparatuses, and non-transitory computer-readable medium described herein may further include operations, features, means, or instructions for transmitting a capability indicator that indicates a defined number of active TCI states, and receiving configuration signaling indicating a defined number of QCL assumptions for at least one physical downlink shared channel (PDSCH) and at least one coreset for a bandwidth part based on transmitting the capability indicator. In some examples of the method, apparatuses, and non-transitory computer-readable medium described herein, the defined number of QCL assumptions active for the UE is less than or equal to the defined number of active TCI states.

In some examples of the method, apparatuses, and non-transitory computer-readable medium described herein, determining the spatial parameters further may include operations, features, means, or instructions for determining that the identified QCL assumption may be ready to be applied a defined number of transmission time intervals after receiving a response from a base station in the random-access procedure. In some examples of the method, apparatuses, and non-transitory computer-readable medium described herein, the TCI state corresponding to the initial coreset is one of a set of TCI states configured in a PDSCH configuration information element (IE).

A method of wireless communication by a base station is described. The method may include transmitting signaling indicating a TCI state corresponding to an initial coreset, identifying a QCL assumption associated with an SSB selected in a random-access procedure, determining spatial parameters for the initial coreset for control information using the indicated TCI state or the identified QCL assumption based on whether a first time at which the indicated TCI state is to be applied is more recent than a second time at which the identified QCL assumption is to be applied, and transmitting control information via the coreset based on the determined spatial parameters.

An apparatus for wireless communication by a base station is described. The apparatus may include a processor, memory in electronic communication with the processor, and instructions stored in the memory. The instructions may be executable by the processor to cause the apparatus to transmit signaling indicating a TCI state corresponding to an initial coreset, identify a QCL assumption associated with an SSB selected in a random-access procedure, determine spatial parameters for the initial coreset for control information using the indicated TCI state or the identified QCL assumption based on whether a first time at which the indicated TCI state is to be applied is more recent than a second time at which the identified QCL assumption is to be applied, and transmit control information via the coreset based on the determined spatial parameters.

Another apparatus for wireless communication by a base station is described. The apparatus may include means for transmitting signaling indicating a TCI state corresponding to an initial coreset, identifying a QCL assumption associated with an SSB selected in a random-access procedure, determining spatial parameters for the initial coreset for control information using the indicated TCI state or the identified QCL assumption based on whether a first time at which the indicated TCI state is to be applied is more recent than a second time at which the identified QCL assumption is to be applied, and transmitting control information via the coreset based on the determined spatial parameters.

A non-transitory computer-readable medium storing code for wireless communication by a base station is described. The code may include instructions executable by a processor to transmit signaling indicating a TCI state corresponding to an initial coreset, identify a QCL assumption associated with an SSB selected in a random-access procedure, determine spatial parameters for the initial coreset for control information using the indicated TCI state or the identified QCL assumption based on whether a first time at which the indicated TCI state is to be applied is more recent than a second time at which the identified QCL assumption is to be applied, and transmit control information via the coreset based on the determined spatial parameters.

In some examples of the method, apparatuses, and non-transitory computer-readable medium described herein, the TCI state indicates a configuration of first and second reference signals that may have a QCL relationship and a QCL type associated with the SSB. In some examples of the method, apparatuses, and non-transitory computer-readable medium described herein, transmitting the control information further may include operations, features, means, or instructions for transmitting the control information in a first control channel monitoring occasion of a plurality of control channel monitoring occasions, where a location of the first control channel monitoring occasion within a common search space of a control channel corresponding to the initial coreset is based at least in part on an SSB index of the SSB.

In some examples of the method, apparatuses, and non-transitory computer-readable medium described herein, the SSB may have a QCL relationship with a reference signal of the indicated TCI state. Some examples of the method, apparatuses, and non-transitory computer-readable medium described herein may further include operations, features, means, or instructions for receiving a capability indicator that indicates a defined number of active TCI states, and transmitting configuration signaling indicating a defined number of QCL assumptions for at least one PDSCH and at least one coreset for a bandwidth part based on receiving the capability indicator. In some examples of the method, apparatuses, and non-transitory computer-readable medium described herein, the defined number of QCL assumptions, for any PDSCH and any coreset, active for the UE is less than or equal to the defined number of active TCI states. In some examples of the method, apparatuses, and non-transitory computer-readable medium described herein, the TCI state corresponding to the initial coreset is one of a set of TCI states configured in a PDSCH configuration IE).

DETAILED DESCRIPTION

In some wireless communications systems, a base station may transmit data or control information to a user equipment (UE) in a beamformed transmission (e.g., on one of a number of configured beams). In such systems, it may be appropriate for the UE to identify appropriate spatial parameters for receiving the beamformed transmission. For instance, it may be appropriate for the UE to identify a delay spread, a Doppler shift, etc. for receiving the beamformed transmission and a suitable beam for receiving the beamformed transmission. In some examples, the UE may identify spatial parameters for receiving the beamformed transmission based on a quasi co-location (QCL) relationship between the beamformed transmission and another transmission (e.g., a reference signal transmission). In some cases, however, the beamformed transmission may be a control information transmission in an initial control resource set (coreset), and the UE may identify multiple QCL relationships between the control information transmission in the initial coreset and other transmissions. In such cases, it may be challenging for the UE to identify the spatial parameters for receiving the control information transmission in the initial coreset.

As described herein, a wireless communications system may support efficient techniques for identifying spatial parameters for receiving a control information transmission in an initial coreset. A UE may receive a TCI state indicating reference signals quasi co-located with the control information transmission in the initial coreset (e.g., coreset #0), and the UE may also identify a QCL assumption in a random-access procedure indicating that a synchronization signal block (SSB) is quasi co-located with the control information transmission in the initial coreset. The random-access procedure may be performed as part of an initial access procedure or a beam failure recovery (BFR) procedure. The UE may then identify spatial parameters for monitoring the initial coreset for the control information transmission in accordance with the TCI state or the QCL assumption based on the timing of the indicated TCI state and the QCL assumption.

Aspects of the disclosure introduced above are described below in the context of a wireless communications system. Examples of processes and signaling exchanges that support configuring TCI states on an initial coreset are then described. Aspects of the disclosure are further illustrated by and described with reference to apparatus diagrams, system diagrams, and flowcharts that relate to configuring TCI states on an initial coreset.

Figure 1:
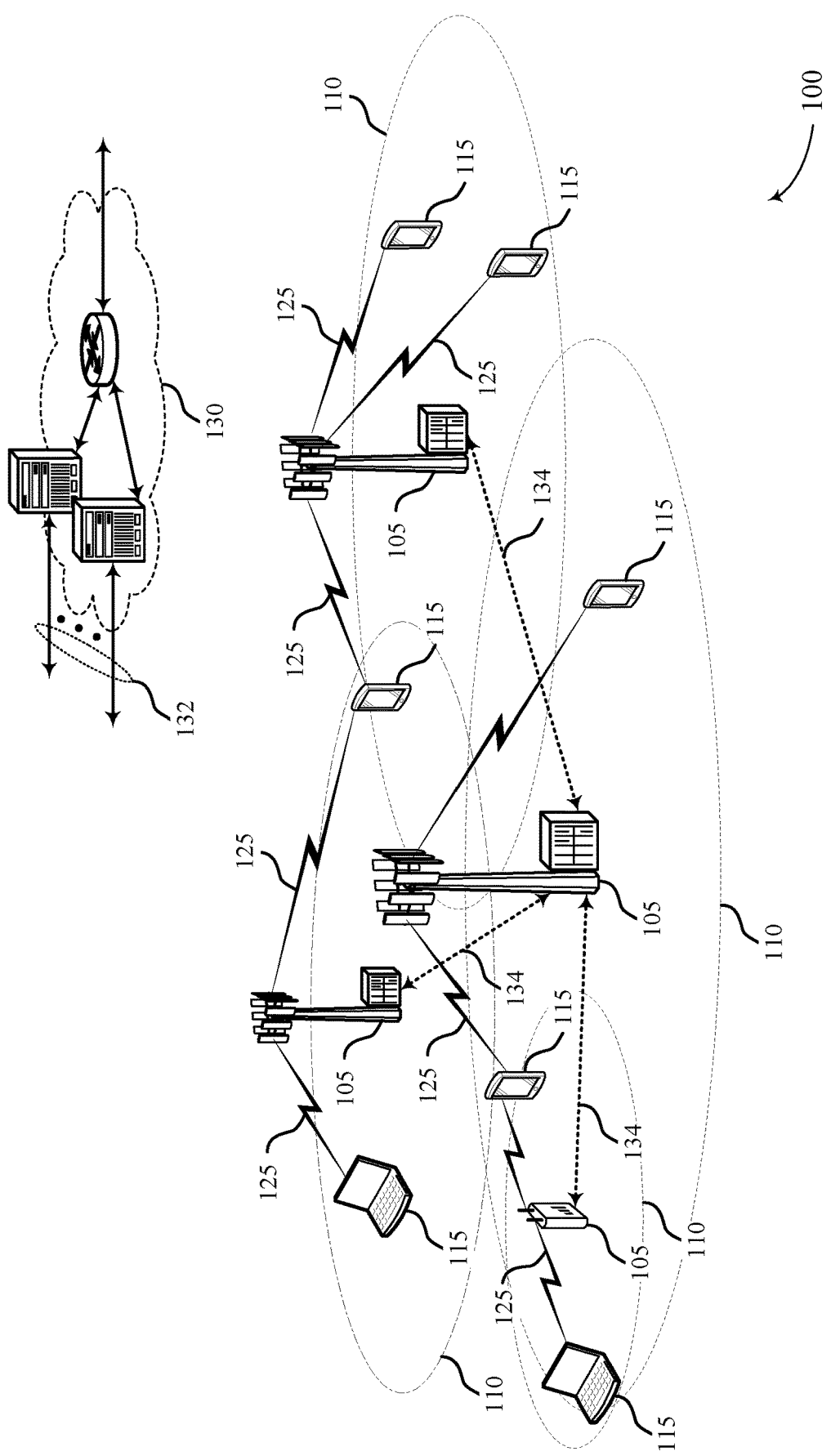
FIGS. 1 and 2 illustrate examples of wireless communications systems that support configuring transmission configuration indication (TCI) states on an initial control resource set (coreset) in accordance with aspects of the present disclosure.

FIG. 1 illustrates an example of a wireless communications system 100 that supports configuring TCI states on an initial coreset in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In wireless communications system 100, a base station 105 may transmit data or control information to a UE 115 in a beamformed transmission (e.g., using one of a number of configured beams). In such systems, it may be appropriate for the UE 115 to identify appropriate spatial parameters for receiving the beamformed transmission. For instance, it may be appropriate for the UE 115 to identify a delay spread, a Doppler shift, etc. for receiving the beamformed transmission and a suitable beam for receiving the beamformed transmission. In some examples, the UE 115 may identify spatial parameters for receiving the beamformed transmission based on a QCL relationship between the beamformed transmission and another transmission (e.g., a reference signal transmission).

In some cases, the beamformed transmission may be a control information transmission in an initial coreset. The initial coreset may be a coreset with an identification (ID) of zero which may be scheduled by a master information block (MIB) received along with a synchronization signal block (SSB) in a random-access procedure performed for initial access or for BFR. In such cases, it may be appropriate for the UE 115 to identify spatial parameters for receiving the control information in the initial coreset. However, the UE 115 may identify multiple QCL relationships between the control information transmission in the initial coreset and other transmissions. In such cases, it may be challenging for the UE 115 to identify the spatial parameters for receiving the control information transmission in the initial coreset. Wireless communications system 100 may support efficient techniques for identifying spatial parameters for receiving control information in an initial coreset.

Figure 2:
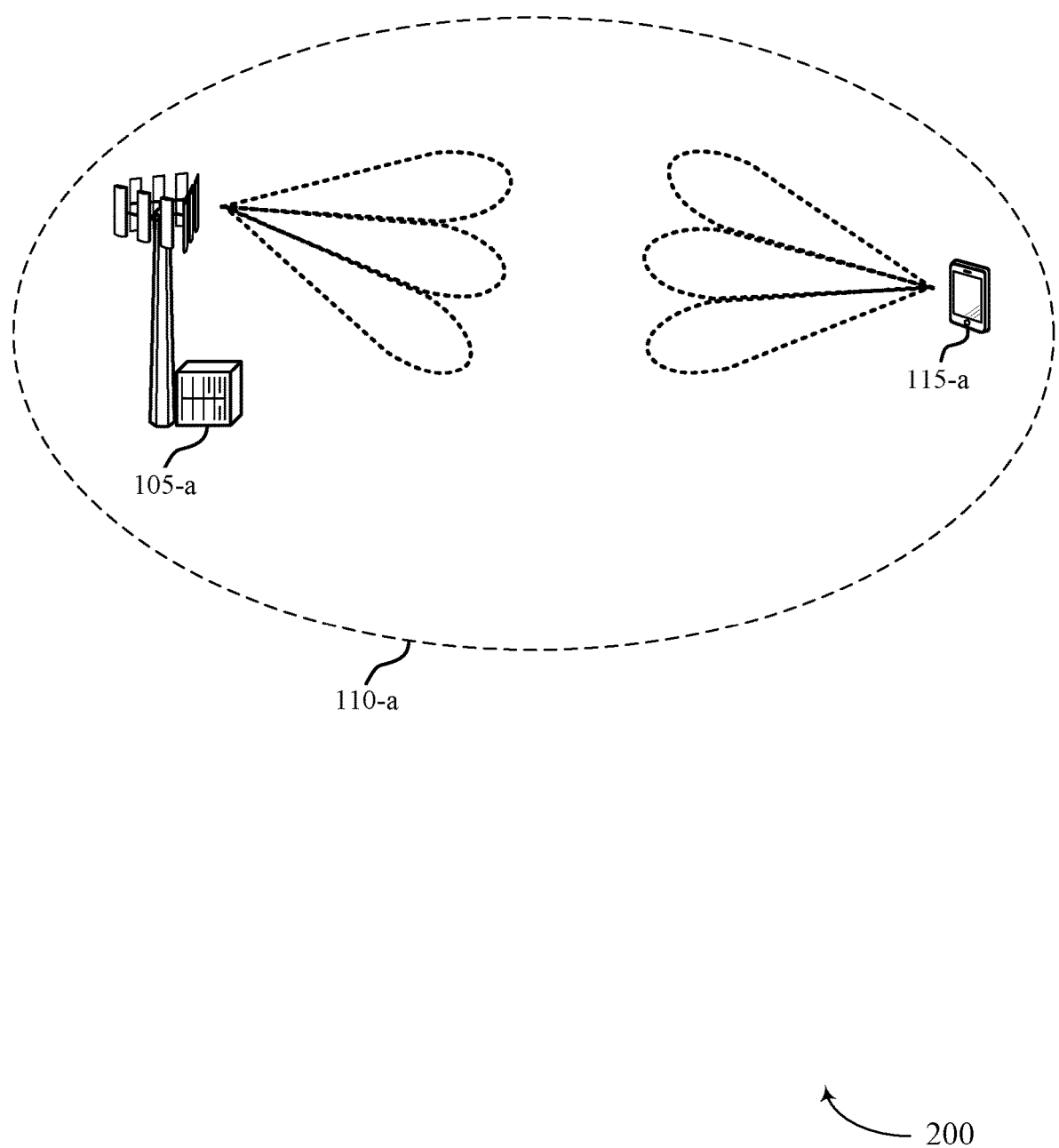

FIG. 2 illustrates an example of a wireless communications system 200 that supports configuring TCI states on an initial coreset in accordance with aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Wireless communications system 200 may implement aspects of wireless communications system 100. For example, wireless communications system 200 may support efficient techniques for identifying spatial parameters for receiving control information in an initial coreset (e.g., coreset 0). Aspects of the techniques described herein may be performed when the coreset ID field is zero (e.g., for an initial coreset), and the TCI state ID field in the MAC-CE indicates a TCI state field in a PDSCH configuration information element (IE).

In one example, UE 115-a may receive a TCI state indicating reference signals quasi co-located with a control information transmission in an initial coreset (e.g., coreset #0), and the UE 115-a may also identify a QCL assumption in a random-access procedure indicating that an SSB is quasi co-located with the control information transmission in the initial coreset. In this example, the UE 115-a may identify spatial parameters for monitoring the initial coreset for the control information transmission in accordance with the TCI state or the QCL assumption based on the timing of the indicated TCI state and the QCL assumption. In particular, UE 115-a may determine spatial parameters for monitoring the initial coreset for control information using the indicated TCI state or the identified QCL assumption based on whether a first time at which the indicated TCI state is to be applied is more recent than a second time at which the identified QCL assumption is to be applied.

If the first time at which the indicated TCI state is to be applied is more recent than (e.g., precedes) the second time at which the identified QCL assumption is to be applied, the UE 115-a may determine spatial parameters for monitoring the initial coreset for control information using the indicated TCI state. Alternatively, if the second time at which the identified QCL assumption is to be applied is more recent than (e.g., precedes) the first time at which the indicated TCI state is to be applied, the UE 115-a may determine spatial parameters for monitoring the initial coreset for control information using the identified QCL assumption. The identified QCL assumption may indicate that the initial coreset is quasi co-located with an SSB selected through a random-access procedure (e.g., selected with a physical random-access channel (PRACH) transmission not initiated by a PDCCH order that triggers a non-contention based random-access procedure). The first time at which the indicated TCI state is to be applied may be after a delay after receiving a MAC control element (MAC-CE) indicating the TCI state, and the second time at which the identified QCL assumption is to be applied may be a time at which the UE 115 receives a response to a PRACH transmission used to select the SSB. In some cases, the MAC-CE based TCI indication delay for the initial coreset may be the same as a MAC-CE based TCI indication delay for other coresets (e.g., 3 ms).

For the initial coreset (e.g., coreset 0), the TCI state indication in the MAC-CE may correspond to TCI states in a PDSCH configuration RRC IE, and, for other coresets (e.g., with an ID greater than 0), the TCI state indication in the MAC-CE may correspond to TCI states in a coreset RRC IE. That is, the TCI state ID may indicate the TCI state identified by the TCI state ID applicable to the coreset identified by the coreset ID field, and, if the field of the coreset ID is set to 0 (i.e., initial coreset), the TCI state ID may indicate a TCI state of the first 64 TCI states in the PDSCH configuration in the active bandwidth part. Thus, in RRC connected mode, for coresets other than the initial coreset, the MAC-CE indicates a TCI state in the PDSCH configuration RRC IE with the restriction of the TCI state indexes configured for the coreset RRC IE.

The UE 115-a may be expected to be configured with a TCI state of channel state information reference signals (CSI-RSs) or tracking reference signals (TRSs) that are quasi co-located with an SSB based on the corresponding QCL type (e.g., with the SSB being the source for the CSI-RSs and the TRSs). For instance, if the TCI state indicates that the initial coreset is quasi co-located with first reference signals (e.g., CSI-RSs) according to a first type (e.g., for some combination of a delay spread, a Doppler shift, etc.), and the initial coreset is quasi co-located with second reference signals (e.g., TRSs) according to a second type (e.g., for another combination of a delay spread, a Doppler shift, etc.), the first and second reference signals may be quasi co-located with a single SSB (e.g., according to the first and second types). That is, if different reference signals are configured in a TCI state, the reference signals may be quasi co-located with the same SSB with corresponding QCL types. In some cases, additional operations may not be performed to handle the QCL relationship between CSI-RSs and TRSs in a TCI state and the quasi co-located SSB.

In some cases, the UE 115-a may fail to receive a TCI state indication for the initial coreset from the base station 105-a in a MAC-CE. It may be up to the base station 105-a (e.g., the network) whether to indicate the TCI state for the initial coreset in the MAC-CE. In such cases, if the TCI state for the initial coreset is not indicated by the MAC-CE (e.g., after a most recent random-access procedure), the UE 115-a may follow the SSB selected in the most recent random-access procedure with a PRACH transmission not initiated by a PDCCH order that triggers a non-contention based random-access procedure to receive any PDCCH with any radio network temporary identifier (RNTI) on the initial coreset. That is, the UE 115-a may determine spatial parameters for monitoring the initial coreset for control information using the identified QCL assumption based failing to receive the TCI state indication for the initial coreset from the base station 105-a.

The initial coreset described herein may be in an initial search space (e.g., a common search space (CSS)), and, for connected state, if a type 0, type OA, or type 2 CSS is the initial search space, the UE 115-a may monitor the CSS on the PDCCH monitoring occasions according to an association with an SSB. That is, the location of the initial coreset in the initial search space may correspond to an SSB or an index of the SSB (e.g., according to a default association). The SSB may be the one quasi co-located to the CSI-RSs or TRSs in the TCI state indicated for the initial coreset or may be the one selected through the random-access procedure with a PRACH transmission not initiated by a PDCCH order that triggers a non-contention based random-access procedure (e.g., whichever is to be applied first or more recently).

In some cases, the UE 115 may report a set (e.g., X) of active TCI states that the UE 115 can support (e.g., for component one of a feature group (FG) indicator, such as FG2-4), and the UE 115 may be expected to be configured or activated with a set of active QCL assumptions (e.g., not more than X) for any PDSCH and any coreset for a given bandwidth part of a serving cell. The UE 115 may report the set of active TCI states using UE capability signaling, and the active TCI state for the initial coreset is counted as one in the UE capability signaling. In some cases, the TCI states applicable to the initial coreset may be up to the first 64 sorted by TCI state IDs and may contain CSI-RSs sourced by SSBs. The QCL assumption for the initial coreset may be updated (e.g., by q_new) after a RACH procedure for BFR or radio link management (RLM). The timing of when the QCL of the initial coreset may be updated in a RACH procedure may be fixed or dynamic. For example, for BFR, the QCL may be updated K symbols after the UE 115-*a* receives a response from the base station 105-*a* successfully (e.g., in a random-access procedure).

In some examples, the CSI-RSs corresponding to an indicated TCI state may be without an SSB as a source in a random-access channel (RACH), and the CSI-RSs may or may not be interpreted as being quasi co-located with an initial coreset. For example, the QCL of the initial coreset may be updated by an SSB or by a CSI-RS with an SSB as the QCL source in RACH. In some cases, the initial coreset may be quasi co-located with a reference signal (e.g., TRS) which may correspond to a refined beam, but the control information transmitted on the initial coreset may be broadcast with a broad beam. In such cases, the base station 105 may transmit the control information with high quality to ensure reception by the UE 115-*a*. That is, it is the responsibility of the base station 105 whether or how to ensure the performance of broadcast PDCCH whose QCL type D is TRS.

Figure 3:
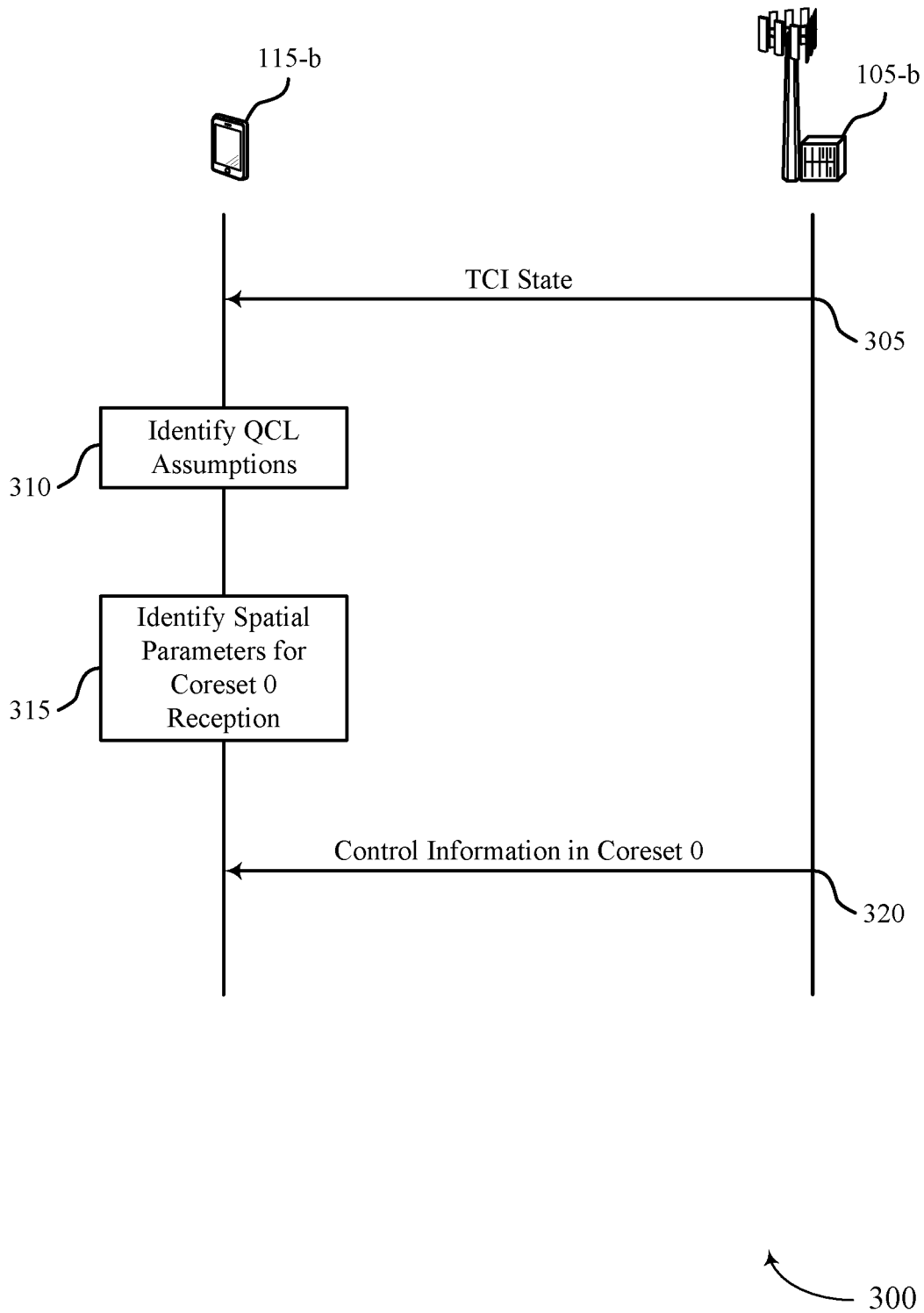
FIG. 3 illustrates an example of a process flow that supports configuring TCI states on an initial coreset in accordance with aspects of the present disclosure.

FIG. 3 illustrates an example of a process flow 300 that supports configuring TCI states on an initial coreset in accordance with aspects of the present disclosure. Process flow 300 illustrates aspects of techniques performed by a base station 105-*b*, which may be an example of a base station 105 described with reference to FIGS. 1 and 2. Process flow 300 also illustrates aspects of techniques performed by UE 115-*b*, which may be an example of a UE 115 described with reference to FIGS. 1 and 2.

At 305, base station 105-*b* may transmit an indication of a TCI state to UE 115-*b* corresponding to an initial coreset. The indication of the TCI state may be a TCI state ID field in a MAC-CE that indicates a TCI state in a PDSCH-Config (e.g., an information element in RRC signaling). At 310, UE 115-*b* may identify a QCL assumption associated with an SSB selected in a random-access procedure. At 315, UE 115-*b* may determine spatial parameters for monitoring the initial coreset for control information using the indicated TCI state or the identified QCL assumption based at least in part on whether a first time at which the indicated TCI state is to be applied is more recent than a second time at which the identified QCL assumption is to be applied. At 320, UE 115-*b* may monitor the initial coreset (i.e., CORESET #0) for control information based at least in part on the determined spatial parameters.

In some cases, the indicated TCI state indicates a configuration of first and second reference signals that have a QCL relationship and a QCL type associated with the SSB or another SSB. In some cases, UE 115-*b* may identify that an SSB index of the SSB corresponds to a first control channel monitoring occasion of a set of control channel monitoring occasions, and UE 115-*b* may monitor a common search space of the first control channel monitoring occasion for the control information. In some cases, the SSB or another SSB has a QCL relationship with a reference signal of the indicated TCI state. In some cases, UE 115-*b* may transmit a capability indicator that indicates a defined number of active TCI states, and UE 115-*b* may receive configuration signaling indicating a defined number of QCL assumption for at least one PDSCH and at least one coreset for a bandwidth part. In some cases, UE 115-*b* may determine that the identified QCL assumption is ready to be applied a defined number of TTIs after receiving a response from base station 105-*b* in the random-access procedure.

Figure 4:
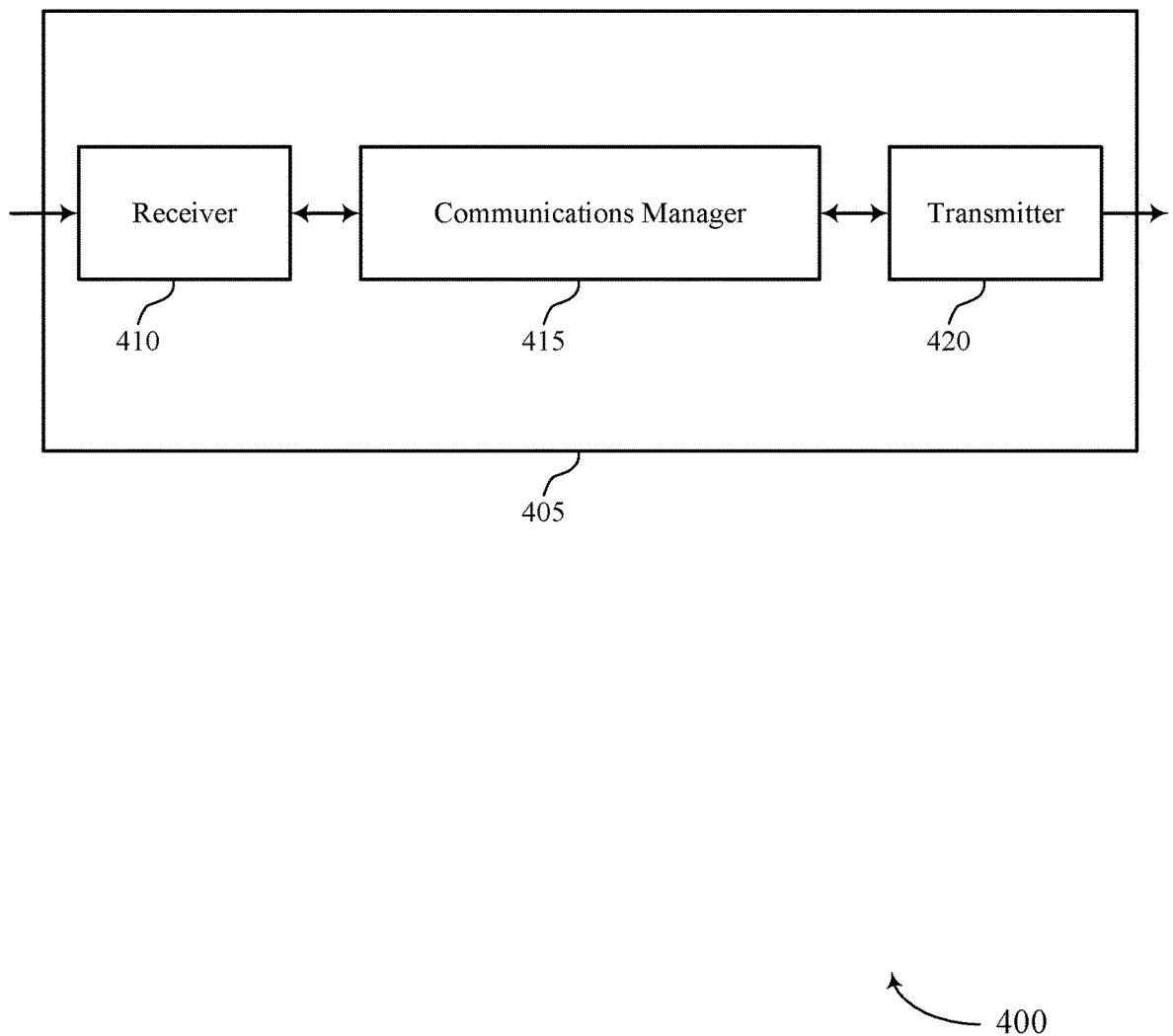
FIGS. 4 and 5 show block diagrams of devices that support configuring TCI states on an initial coreset in accordance with aspects of the present disclosure.

FIG. 4 shows a block diagram 400 of a device 405 that supports configuring TCI states on an initial coreset in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to configuring TCI states on an initial coreset, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive signaling indicating a TCI state corresponding to an initial coreset, identify a QCL assumption associated with an SSB selected in a random-access procedure, determine spatial parameters for monitoring the initial coreset for control information using the indicated TCI state or the identified QCL assumption based on whether a first time at which the indicated TCI state is to be applied is more recent than a second time at which the identified QCL assumption is to be applied, and monitor the coreset based on the determined spatial parameters. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
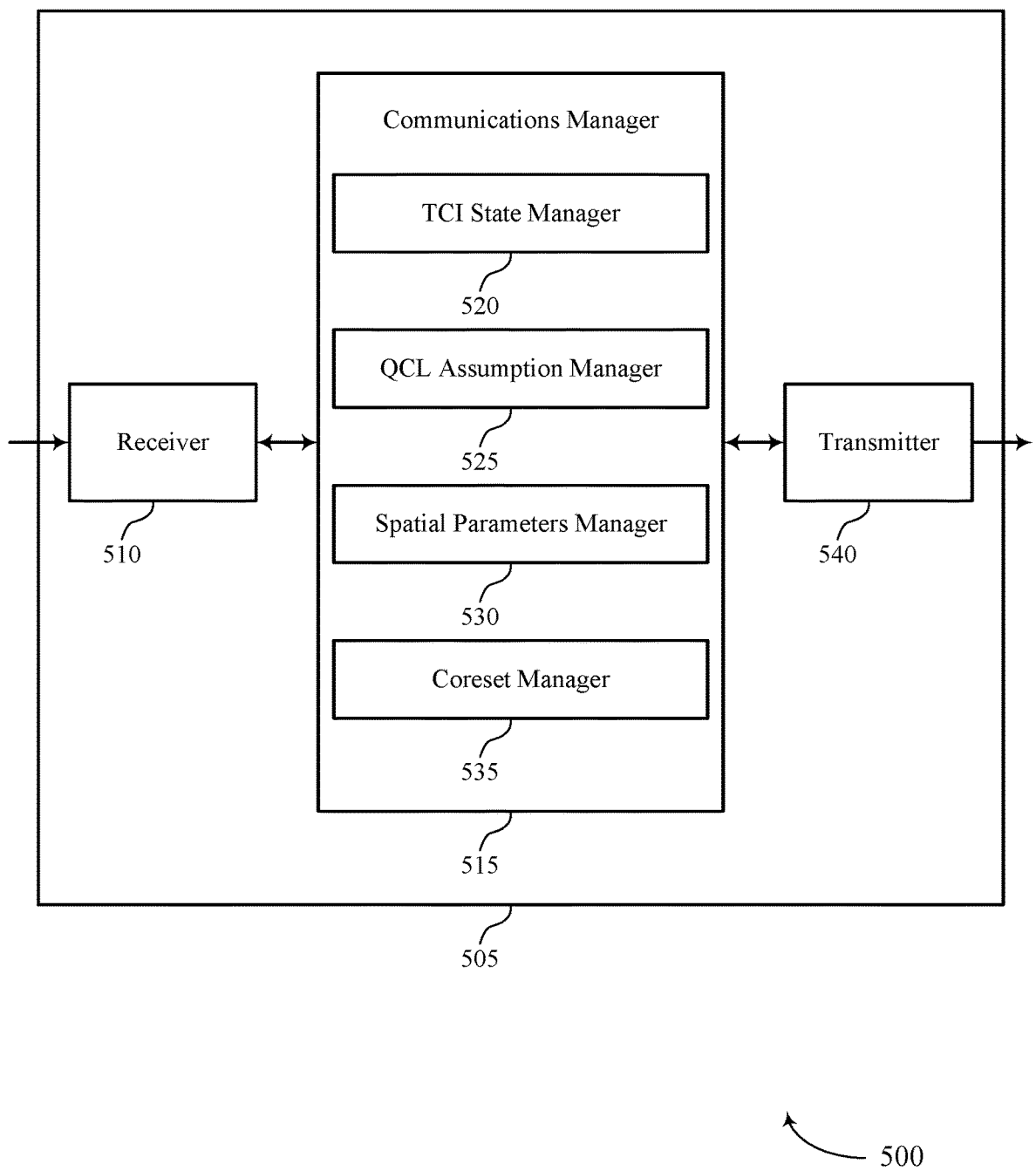

FIG. 5 shows a block diagram 500 of a device 505 that supports configuring TCI states on an initial coreset in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to configuring TCI states on an initial coreset, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a TCI state manager 520, a QCL assumption manager 525, a spatial parameters manager 530, and a coreset manager 535. The communications manager 515 may be an example of aspects of the communications manager 710 described herein.

The TCI state manager 520 may receive signaling indicating a TCI state corresponding to an initial coreset. The QCL assumption manager 525 may identify a QCL assumption associated with an SSB selected in a random-access procedure. The spatial parameters manager 530 may determine spatial parameters for monitoring the initial coreset for control information using the indicated TCI state or the identified QCL assumption based on whether a first time at which the indicated TCI state is to be applied is more recent than a second time at which the identified QCL assumption is to be applied. The coreset manager 535 may monitor the coreset based on the determined spatial parameters.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
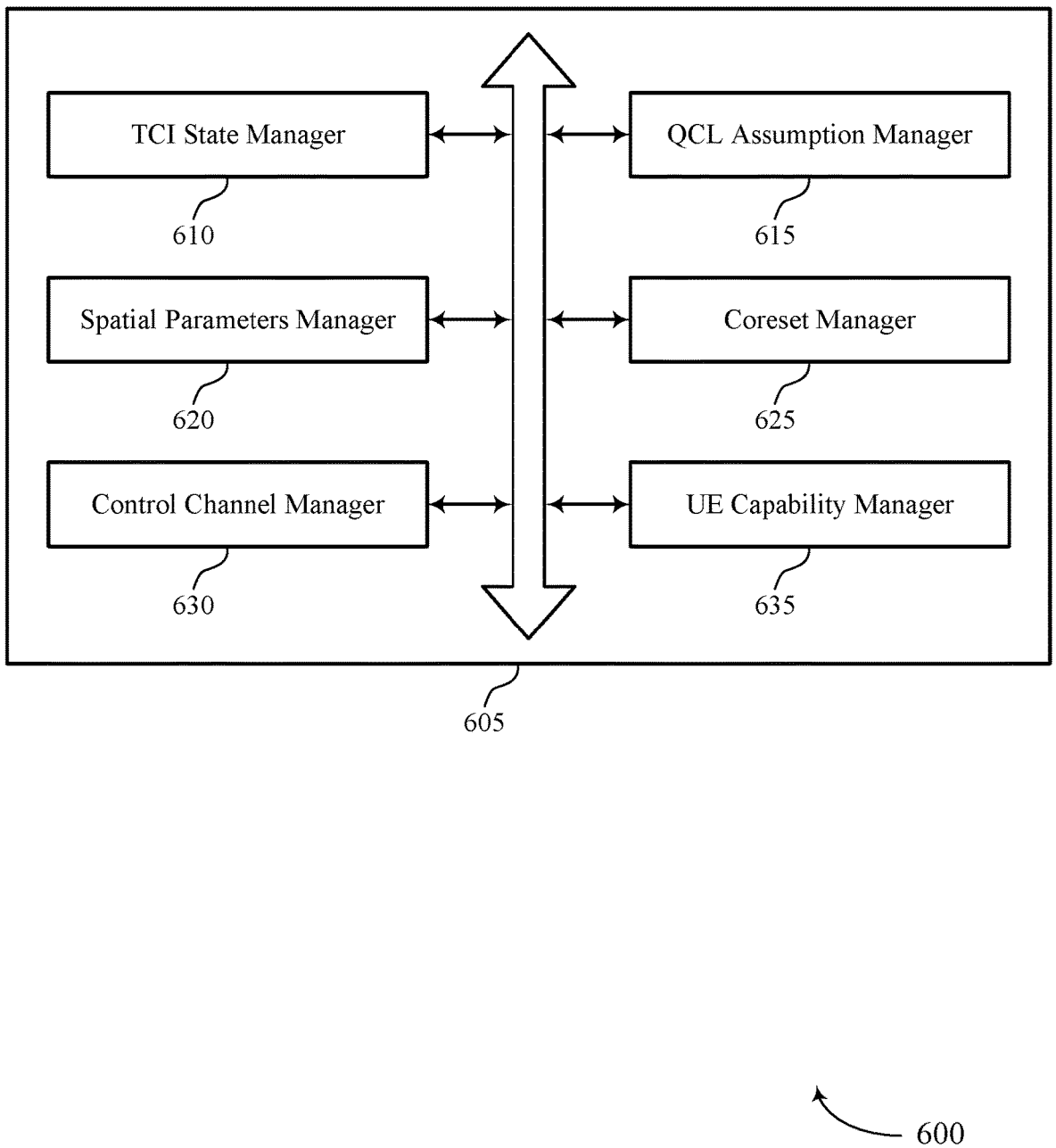
FIG. 6 shows a block diagram of a communications manager that supports configuring TCI states on an initial coreset in accordance with aspects of the present disclosure.

FIG. 6 shows a block diagram 600 of a communications manager 605 that supports configuring TCI states on an initial coreset in accordance with aspects of the present disclosure. The communications manager 605 may be an example of aspects of a communications manager 415, a communications manager 515, or a communications manager 710 described herein. The communications manager 605 may include a TCI state manager 610, a QCL assumption manager 615, a spatial parameters manager 620, a coreset manager 625, a control channel manager 630, and a UE capability manager 635. Each of these modules may communicate, directly or indirectly, with one another (e.g., via one or more buses).

The TCI state manager 610 may receive signaling indicating a TCI state corresponding to an initial coreset. In some cases, the TCI state indicates a configuration of first and second reference signals that have a QCL relationship and a QCL type associated with the SSB. The QCL assumption manager 615 may identify a QCL assumption associated with an SSB selected in a random-access procedure. In some cases, the TCI state corresponding to the initial coreset is one of a set of TCI states configured in a PDSCH configuration element.

In some examples, the QCL assumption manager 615 may receive configuration signaling indicating a defined number of QCL assumptions for at least one PDSCH and at least one coreset for a bandwidth part based on transmitting the capability indicator. In some cases, the defined number of QCL assumptions active for the UE is less than or equal to the defined number of active TCI states. In some examples, the QCL assumption manager 615 may determine that the identified QCL assumption is ready to be applied a defined number of transmission time intervals after receiving a response from a base station in the random-access procedure. In some cases, the SSB has a QCL relationship with a reference signal of the indicated TCI state. In some cases, the SSB is selected through the random-access procedure not triggered by a PDCCH order that triggers a non-contention based random-access procedure.

The spatial parameters manager 620 may determine spatial parameters for monitoring the initial coreset for control information using the indicated TCI state or the identified QCL assumption based on whether a first time at which the indicated TCI state is to be applied is more recent than a second time at which the identified QCL assumption is to be applied. The coreset manager 625 may monitor the coreset based on the determined spatial parameters. The control channel manager 630 may identify that an SSB index of the SSB corresponds to a first control channel monitoring occasion of a set of control channel monitoring occasions. In some examples, the control channel manager 630 may monitor a common search space of the first control channel monitoring occasion for the control information. The UE capability manager 635 may transmit a capability indicator that indicates a defined number of active TCI states.

Figure 7:
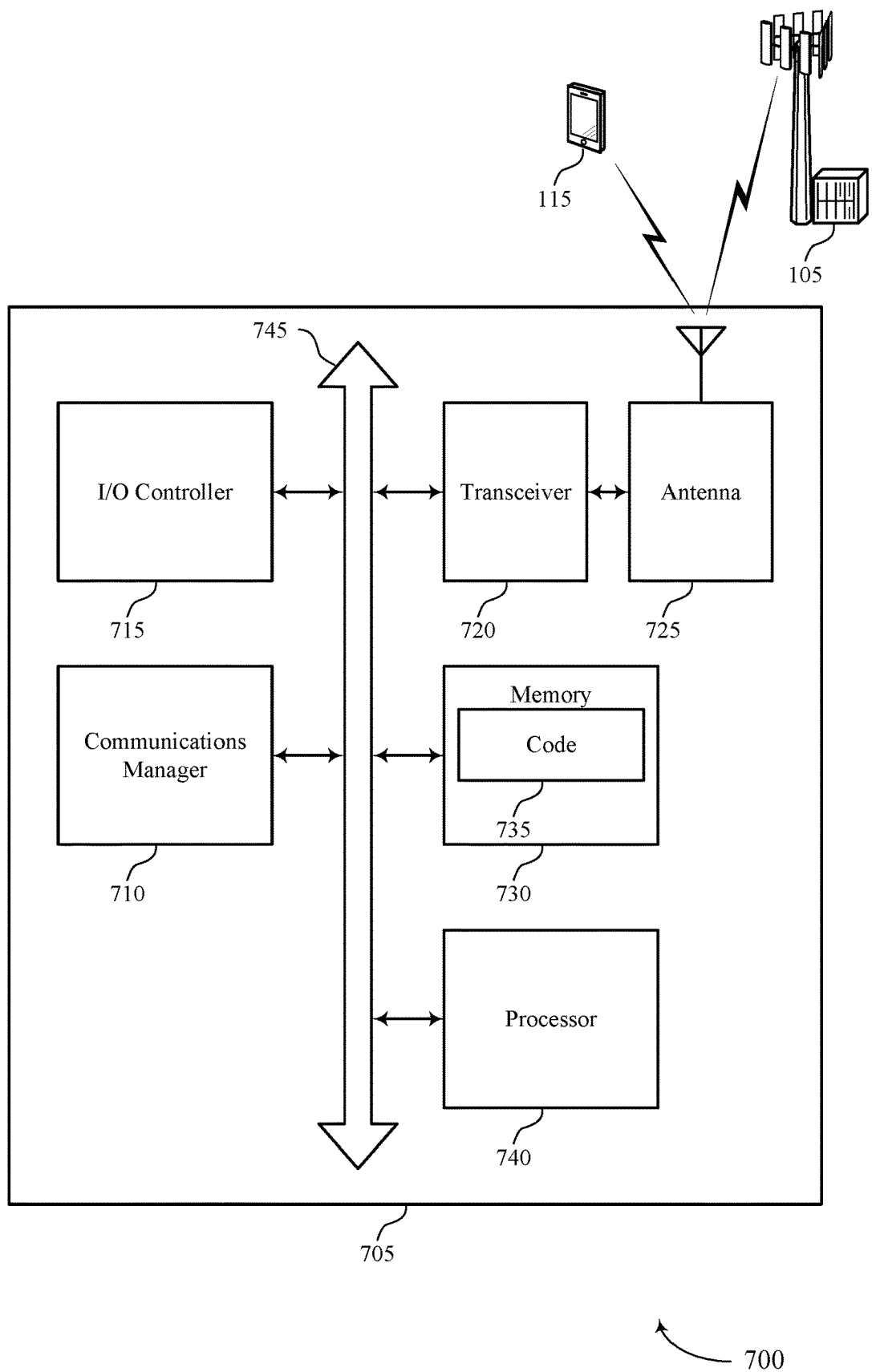
FIG. 7 shows a diagram of a system including a device that supports configuring TCI states on an initial coreset in accordance with aspects of the present disclosure.

FIG. 7 shows a diagram of a system 700 including a device 705 that supports configuring TCI states on an initial coreset in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive signaling indicating a TCI state corresponding to an initial coreset, identify a QCL assumption associated with an SSB selected in a random-access procedure, determine spatial parameters for monitoring the initial coreset for control information using the indicated TCI state or the identified QCL assumption based on whether a first time at which the indicated TCI state is to be applied is more recent than a second time at which the identified QCL assumption is to be applied, and monitor the coreset based on the determined spatial parameters.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touch-screen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting configuring TCI states on an initial coreset).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
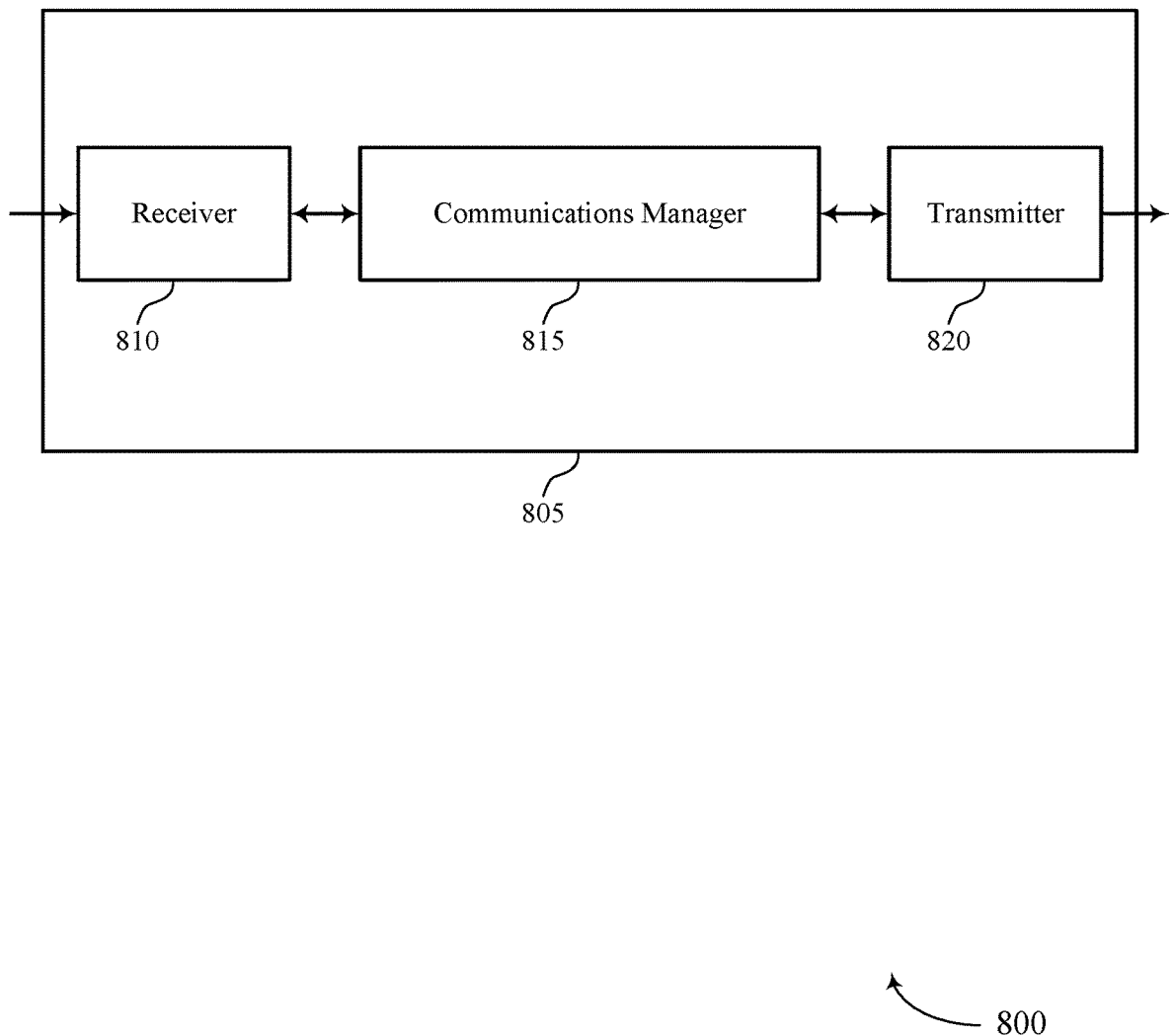
FIGS. 8 and 9 show block diagrams of devices that support configuring TCI states on an initial coreset in accordance with aspects of the present disclosure.

FIG. 8 shows a block diagram 800 of a device 805 that supports configuring TCI states on an initial coreset in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to configuring TCI states on an initial coreset, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit signaling indicating a TCI state corresponding to an initial coreset, identify a QCL assumption associated with an SSB selected in a random-access procedure, determine spatial parameters for the initial coreset for control information using the indicated TCI state or the identified QCL assumption based on whether a first time at which the indicated TCI state is to be applied is more recent than a second time at which the identified QCL assumption is to be applied, and transmit control information via the coreset based on the determined spatial parameters. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
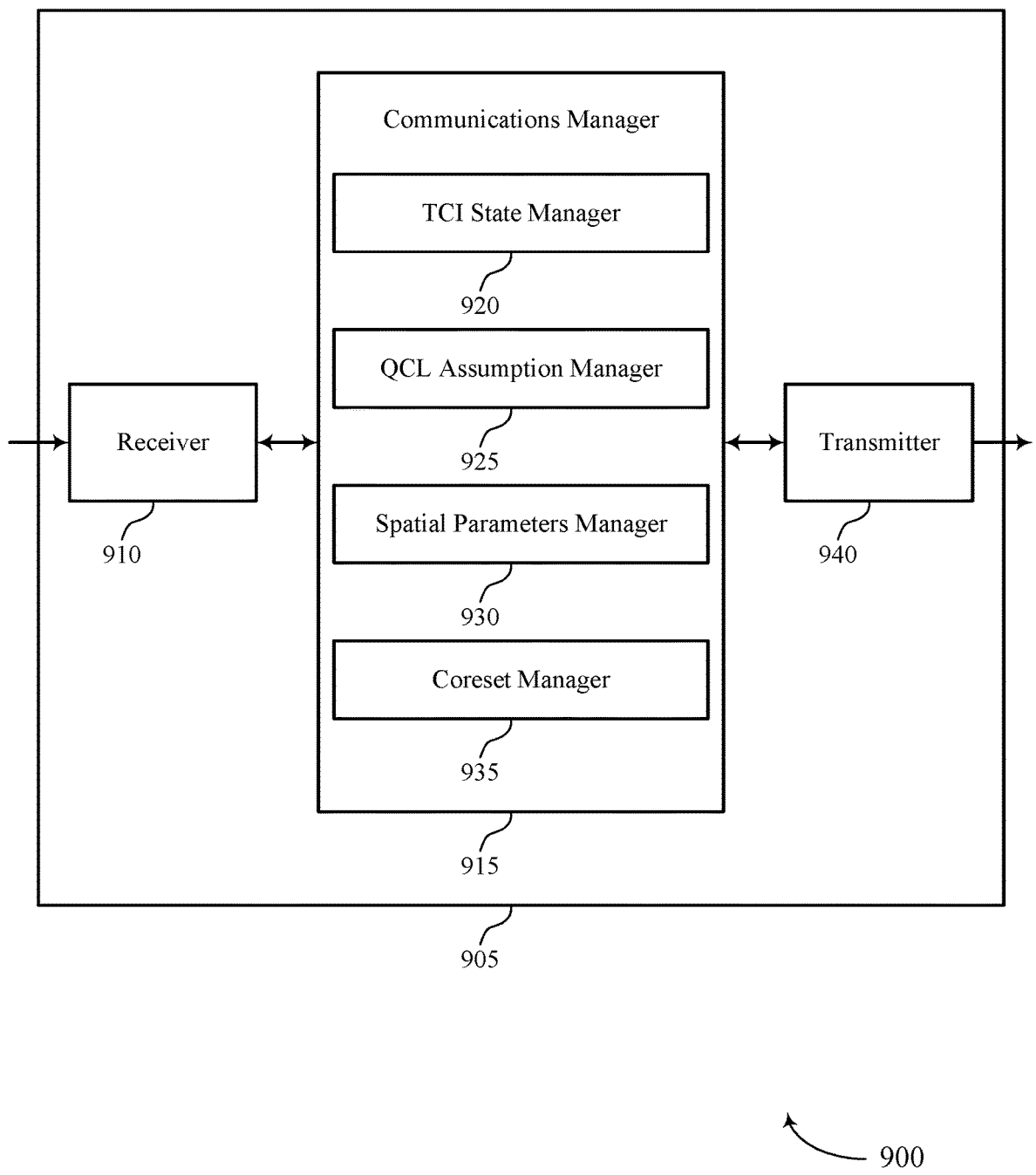

FIG. 9 shows a block diagram 900 of a device 905 that supports configuring TCI states on an initial coreset in accordance with aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to configuring TCI states on an initial coreset, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a TCI state manager 920, a QCL assumption manager 925, a spatial parameters manager 930, and a coreset manager 935.

The communications manager 915 may be an example of aspects of the communications manager 1110 described herein.

The TCI state manager 920 may transmit signaling indicating a TCI state corresponding to an initial coreset. The QCL assumption manager 925 may identify a QCL assumption associated with an SSB selected in a random-access procedure. The spatial parameters manager 930 may determine spatial parameters for the initial coreset for control information using the indicated TCI state or the identified QCL assumption based on whether a first time at which the indicated TCI state is to be applied is more recent than a second time at which the identified QCL assumption is to be applied. The coreset manager 935 may transmit control information via the coreset based on the determined spatial parameters.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
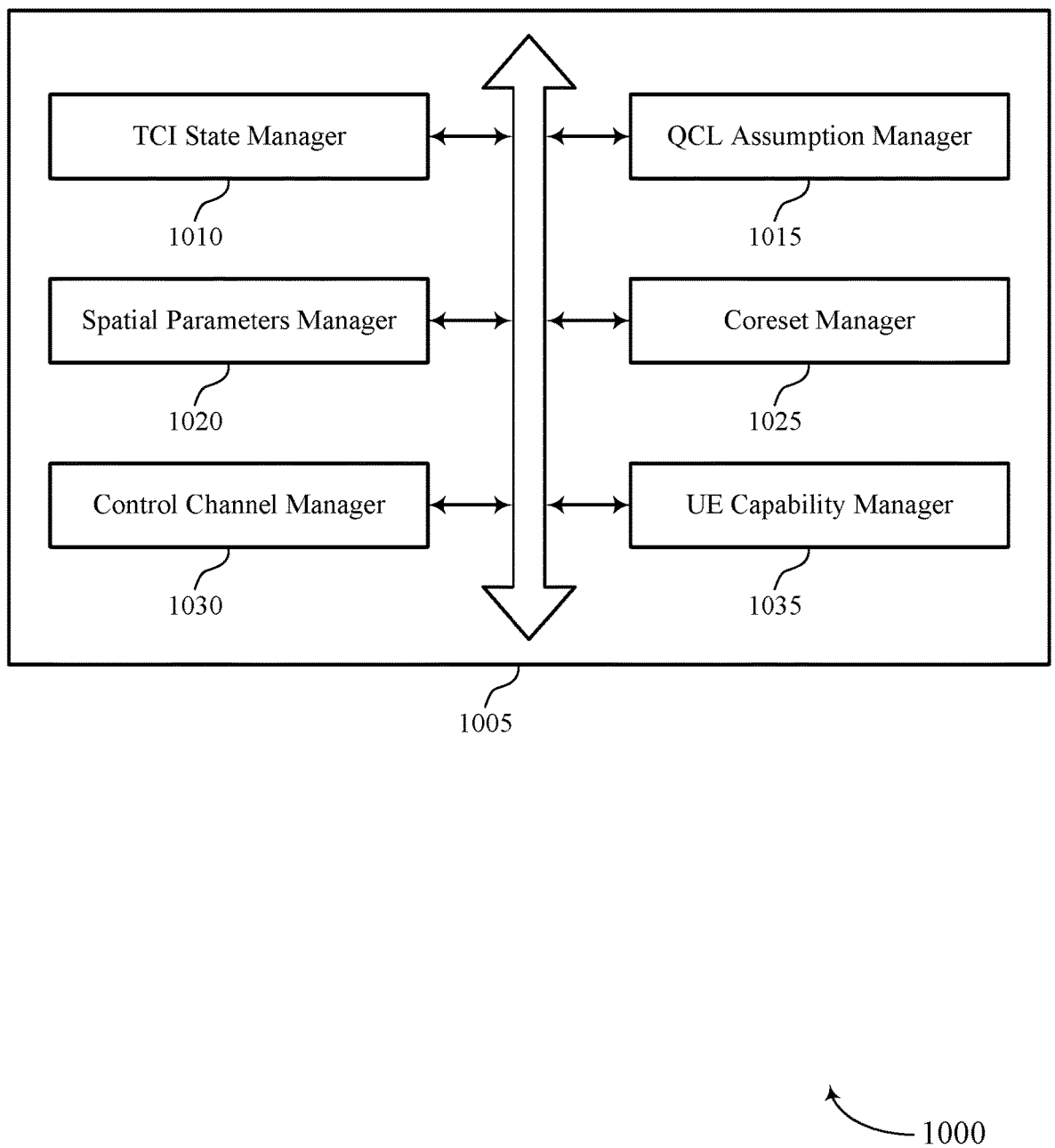
FIG. 10 shows a block diagram of a communications manager that supports configuring TCI states on an initial coreset in accordance with aspects of the present disclosure.

FIG. 10 shows a block diagram 1000 of a communications manager 1005 that supports configuring TCI states on an initial coreset in accordance with aspects of the present disclosure. The communications manager 1005 may be an example of aspects of a communications manager 815, a communications manager 915, or a communications manager 1110 described herein. The communications manager 1005 may include a TCI state manager 1010, a QCL assumption manager 1015, a spatial parameters manager 1020, a coreset manager 1025, a control channel manager 1030, and a UE capability manager 1035. Each of these modules may communicate, directly or indirectly, with one another (e.g., via one or more buses).

The TCI state manager 1010 may transmit signaling indicating a TCI state corresponding to an initial coreset. In some cases, the TCI state indicates a configuration of first and second reference signals that have a QCL relationship and a QCL type associated with the SSB. The QCL assumption manager 1015 may identify a QCL assumption associated with an SSB selected in a random-access procedure. In some examples, the QCL assumption manager 1015 may transmit configuration signaling indicating a defined number of QCL assumptions for at least one PDSCH and at least one coreset for a bandwidth part based at least in part on receiving the capability indicator. In some cases, the defined number of QCL assumptions active for the UE is less than or equal to the defined number of active TCI states. In some cases, the SSB has a QCL relationship with a reference signal of the indicated TCI state. In some cases, the TCI state corresponding to the initial coreset is one of a set of TCI states configured in a physical downlink shared channel configuration information element.

The spatial parameters manager 1020 may determine spatial parameters for the initial coreset for control information using the indicated TCI state or the identified QCL assumption based on whether a first time at which the indicated TCI state is to be applied is more recent than a second time at which the identified QCL assumption is to be applied. The coreset manager 1025 may transmit control information via the coreset based on the determined spatial parameters. In some examples, the control channel manager 1030 may transmit the control information in a first control channel monitoring occasion of a set of control channel monitoring occasions, where a location of the first control channel monitoring occasion within a common search space of a control channel corresponding to the initial coreset is based at least in part on an SSB index of the SSB. The UE capability manager 1035 may receive a capability indicator that indicates a defined number of active TCI states.

Figure 11:
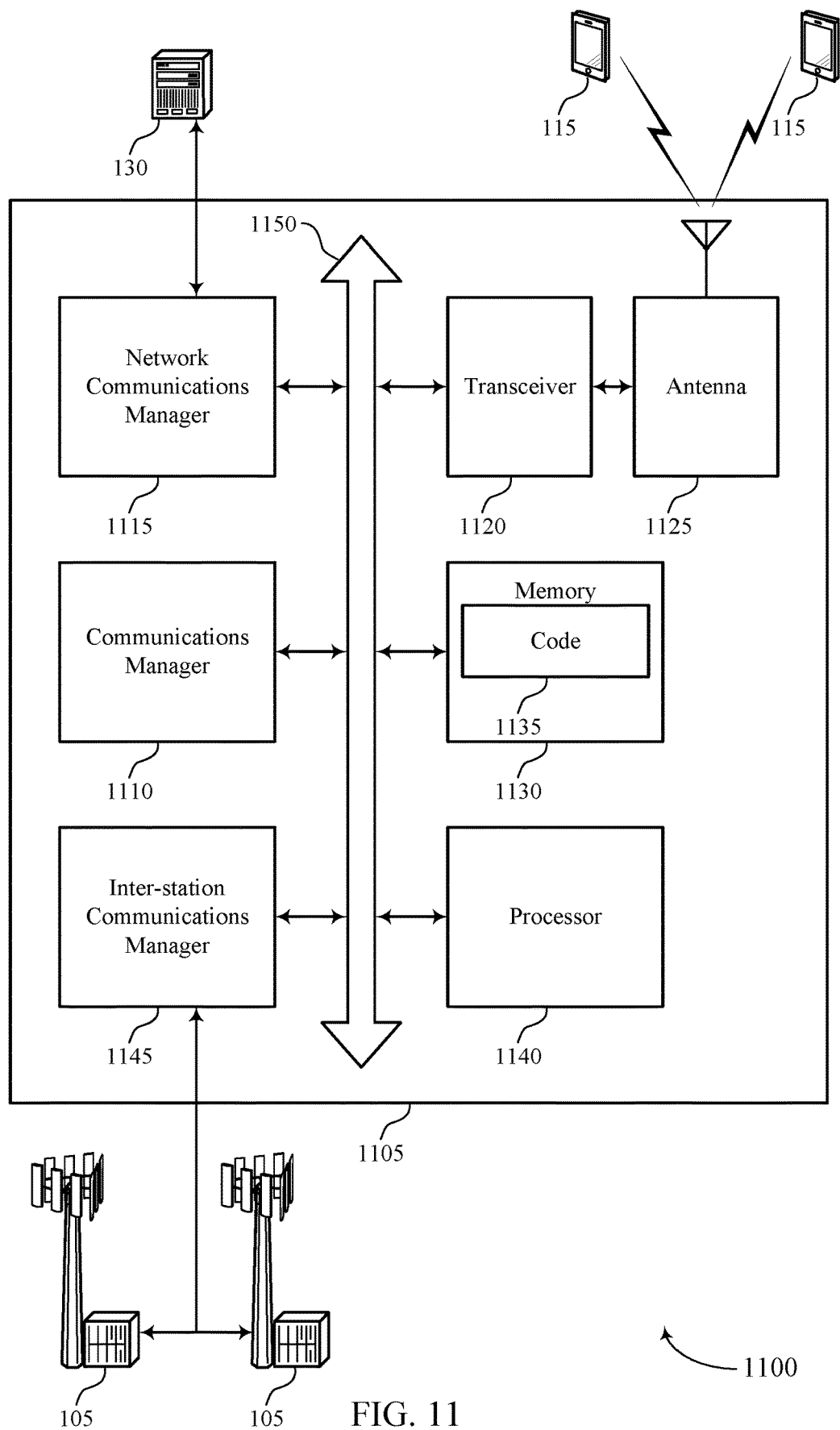
FIG. 11 shows a diagram of a system including a device that supports configuring TCI states on an initial coreset in accordance with aspects of the present disclosure.

FIG. 11 shows a diagram of a system 1100 including a device 1105 that supports configuring TCI states on an initial coreset in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit signaling indicating a TCI state corresponding to an initial coreset, identify a QCL assumption associated with an SSB selected in a random-access procedure, determine spatial parameters for the initial coreset for control information using the indicated TCI state or the identified QCL assumption based on whether a first time at which the indicated TCI state is to be applied is more recent than a second time at which the identified QCL assumption is to be applied, and transmit control information via the coreset based on the determined spatial parameters.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor

1140. The processor 1140 may be configured to execute computer-readable instructions stored in a memory (e.g., the memory 1130) to cause the device 1105 to perform various functions (e.g., functions or tasks supporting configuring TCI states on an initial coreset).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
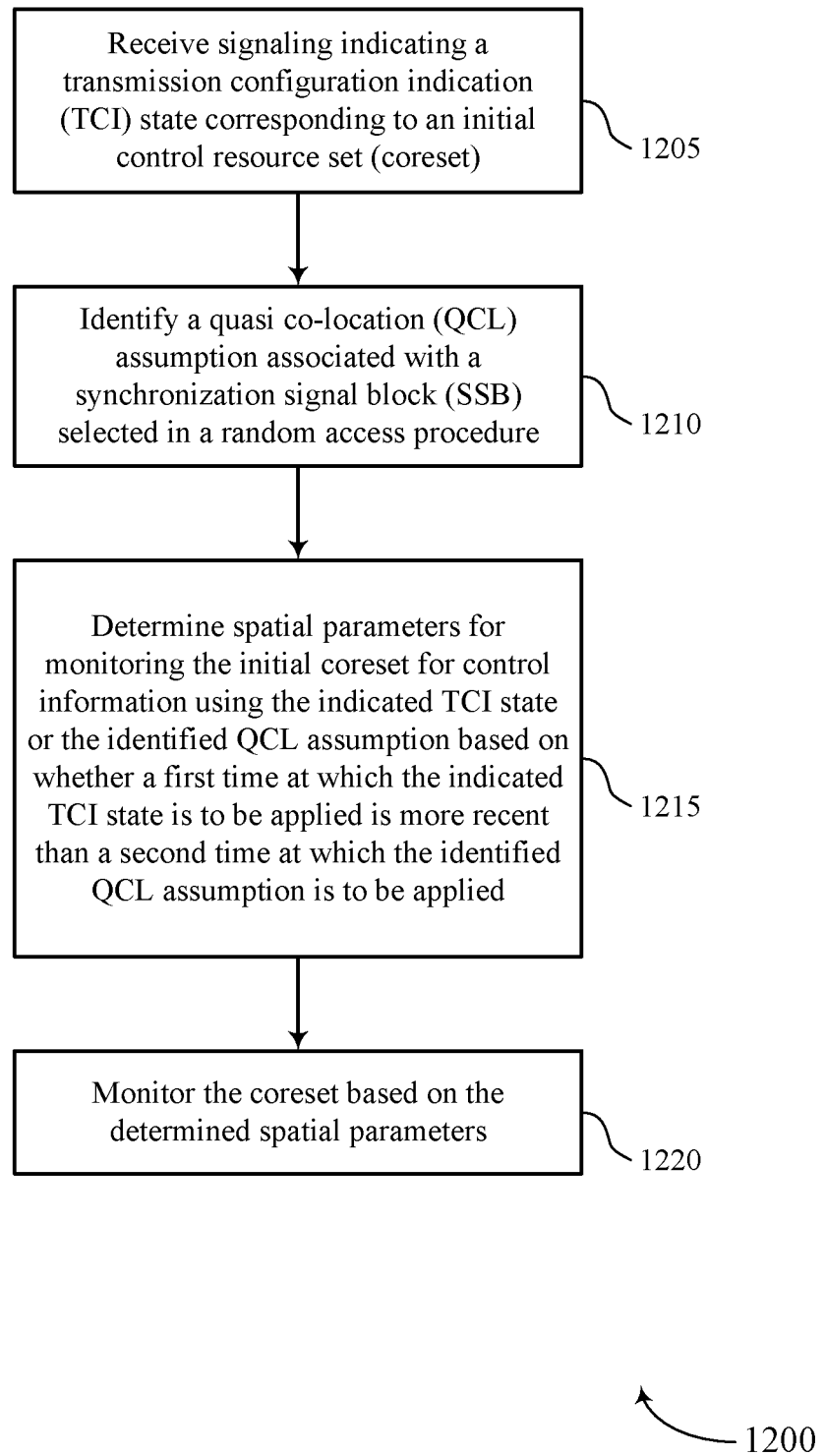
FIGS. 12 and 13 show flowcharts illustrating methods that support configuring TCI states on an initial coreset in accordance with aspects of the present disclosure.

FIG. 12 shows a flowchart illustrating a method 1200 that supports configuring TCI states on an initial coreset in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may receive signaling indicating a TCI state corresponding to an initial coreset. The operations of 1205 may be performed according to the methods described herein. In some examples, aspects of the operations of 1205 may be performed by a TCI state manager as described with reference to FIGS. 4 through 7.

At 1210, the UE may identify a QCL assumption associated with an SSB selected in a random-access procedure. The operations of 1210 may be performed according to the methods described herein. In some examples, aspects of the operations of 1210 may be performed by a QCL assumption manager as described with reference to FIGS. 4 through 7.

At 1215, the UE may determine spatial parameters for monitoring the initial coreset for control information using the indicated TCI state or the identified QCL assumption based on whether a first time at which the indicated TCI state is to be applied is more recent than a second time at which the identified QCL assumption is to be applied. The operations of 1215 may be performed according to the methods described herein. In some examples, aspects of the operations of 1215 may be performed by a spatial parameters manager as described with reference to FIGS. 4 through 7.

At 1220, the UE may monitor the coreset based on the determined spatial parameters. The operations of 1220 may be performed according to the methods described herein. In some examples, aspects of the operations of 1220 may be performed by a coreset manager as described with reference to FIGS. 4 through 7.

Figure 13:
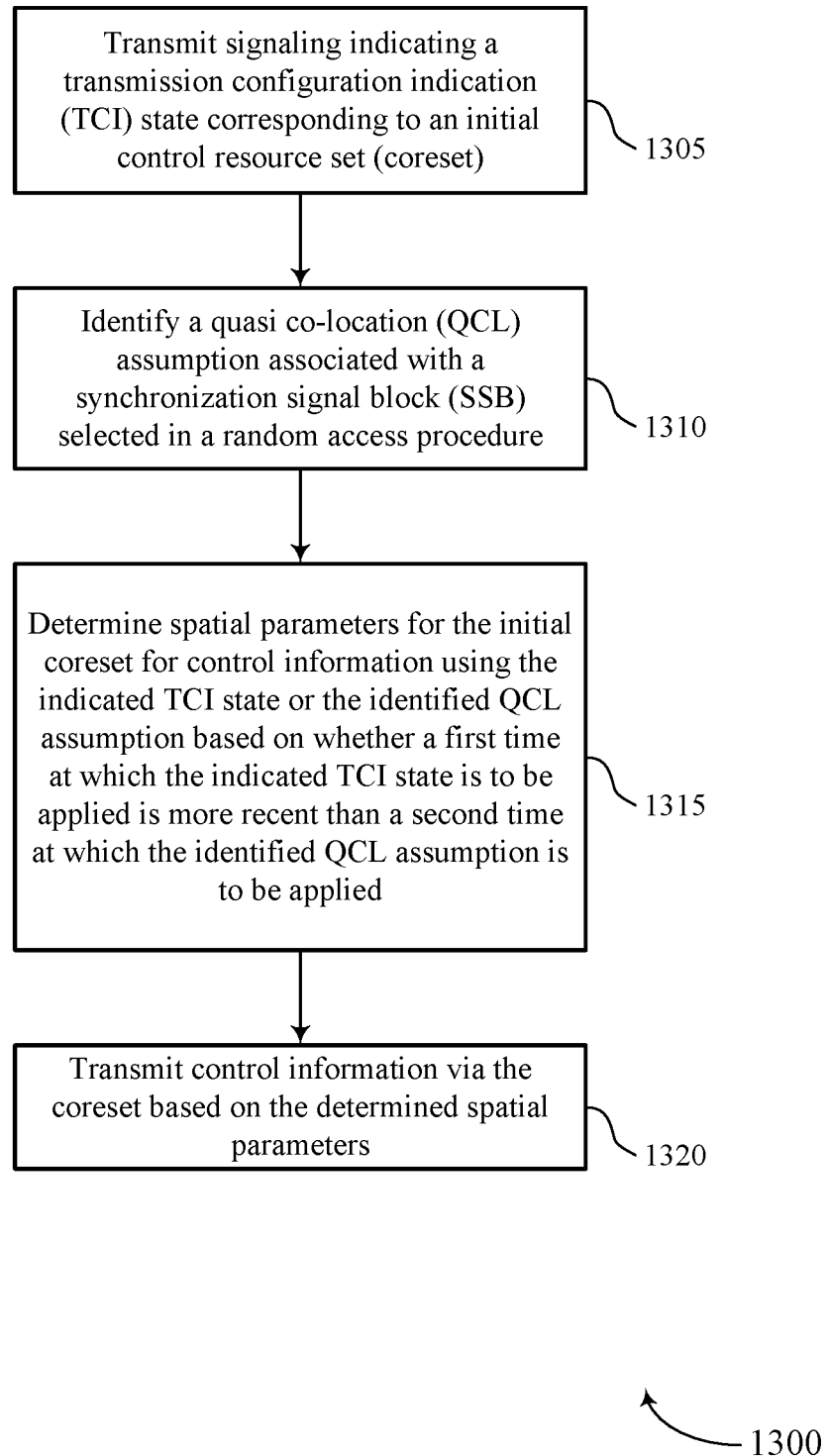

FIG. 13 shows a flowchart illustrating a method 1300 that supports configuring TCI states on an initial coreset in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1305, the base station may transmit signaling indicating a TCI state corresponding to an initial coreset. The operations of 1305 may be performed according to the methods described herein. In some examples, aspects of the operations of 1305 may be performed by a TCI state manager as described with reference to FIGS. 8 through 11.

At 1310, the base station may identify a QCL assumption associated with an SSB selected in a random-access procedure. The operations of 1310 may be performed according to the methods described herein. In some examples, aspects of the operations of 1310 may be performed by a QCL assumption manager as described with reference to FIGS. 8 through 11.

At 1315, the base station may determine spatial parameters for the initial coreset for control information using the indicated TCI state or the identified QCL assumption based on whether a first time at which the indicated TCI state is to be applied is more recent than a second time at which the identified QCL assumption is to be applied. The operations of 1315 may be performed according to the methods described herein. In some examples, aspects of the operations of 1315 may be performed by a spatial parameters manager as described with reference to FIGS. 8 through 11.

At 1320, the base station may transmit control information via the coreset based on the determined spatial parameters. The operations of 1320 may be performed according to the methods described herein. In some examples, aspects of the operations of 1320 may be performed by a coreset manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    receiving signaling indicating a transmission configuration indication (TCI) state corresponding to an initial control resource set (coreset);
    identifying a quasi co-location (QCL) assumption associated with a synchronization signal block (SSB) selected in a random-access procedure, wherein the SSB is selected through the random-access procedure not initiated by a physical downlink control channel (PDCCH) order that triggers a non-contention based random-access procedure;
    determining spatial parameters for monitoring the initial coreset for control information using the indicated TCI state or the identified QCL assumption based at least in part on whether the indicated TCI state is more recent than the identified QCL assumption; and
    monitoring the initial coreset based at least in part on the determined spatial parameters.

2. The method of claim 1, wherein the TCI state indicates a configuration of first and second reference signals that have a QCL relationship and a QCL type associated with the SSB.

3. The method of claim 1, wherein receiving the signaling further comprises:
    identifying that an SSB index of the SSB corresponds to a first control channel monitoring occasion of a plurality of control channel monitoring occasions; and
    monitoring a common search space of the first control channel monitoring occasion for the control information.

4. The method of claim 1, wherein the SSB has a QCL relationship with a reference signal of the indicated TCI state.

5. The method of claim 1, further comprising:
    transmitting a capability indicator that indicates a defined number of active TCI states; and
    receiving configuration signaling indicating a defined number of QCL assumptions for at least one physical downlink shared channel (PDSCH) and at least one coreset for a bandwidth part based at least in part on transmitting the capability indicator.

6. The method of claim 5, wherein the defined number of QCL assumptions active for the UE is less than or equal to the defined number of active TCI states.

7. The method of claim 1, wherein determining the spatial parameters further comprises:
    determining that the identified QCL assumption is ready to be applied a defined number of transmission time intervals after receiving a response from a base station in the random-access procedure.

8. The method of claim 1, wherein the TCI state corresponding to the initial coreset is one of a set of TCI states configured in a physical downlink shared channel (PDSCH) configuration information element.

9. A method for wireless communication by a base station, comprising:
    transmitting signaling indicating a transmission configuration indication (TCI) state corresponding to an initial control resource set (coreset);
    identifying a quasi co-location (QCL) assumption associated with a synchronization signal block (SSB) selected in a random-access procedure, wherein the SSB is selected through the random-access procedure not initiated by a physical downlink control channel (PDCCH) order that triggers a non-contention based random-access procedure;
    determining spatial parameters for the initial coreset for control information using the indicated TCI state or the identified QCL assumption based at least in part on whether the indicated TCI state is more recent than the identified QCL assumption; and
    transmitting the control information via the initial coreset based at least in part on the determined spatial parameters.

10. The method of claim 9, wherein the TCI state indicates a configuration of first and second reference signals that have a QCL relationship and a QCL type associated with the SSB.

11. The method of claim 9, wherein transmitting the control information comprises:
    transmitting the control information in a first control channel monitoring occasion of a plurality of control channel monitoring occasions, wherein a location of the first control channel monitoring occasion within a common search space of a control channel corresponding to the initial coreset is based at least in part on an SSB index of the SSB.

12. The method of claim 9, wherein the SSB has a QCL relationship with a reference signal of the indicated TCI state.

13. The method of claim 9, further comprising:
    receiving a capability indicator that indicates a defined number of active TCI states; and
    transmitting configuration signaling indicating a defined number of QCL assumptions for at least one physical downlink shared channel and at least one coreset for a bandwidth part based at least in part on receiving the capability indicator.

14. The method of claim 13, wherein the defined number of QCL assumptions active for a user equipment (UE) is less than or equal to the defined number of active TCI states.

15. The method of claim 9, wherein the TCI state corresponding to the initial coreset is one of a set of TCI states configured in a physical downlink shared channel (PDSCH) configuration information element.

16. An apparatus for wireless communication by a user equipment (UE), comprising: a processor, memory in electronic communication with the processor; and instructions stored in the memory and executable by the processor to cause the apparatus to:

receive signaling indicating a transmission configuration indication (TCI) state corresponding to an initial control resource set (coreset);

identify a quasi co-location (QCL) assumption associated with a synchronization signal block (SSB) selected in a random-access procedure, wherein the SSB is selected through the random-access procedure not initiated by a physical downlink control channel (PDCCH) order that triggers a non-contention based random-access procedure;

determine spatial parameters for monitoring the initial coreset for control information using the indicated TCI state or the identified QCL assumption based at least in part on whether the indicated TCI state is more recent than the identified QCL assumption; and monitor the initial coreset based at least in part on the determined spatial parameters.

17. The apparatus of claim 16, wherein the TCI state indicates a configuration of first and second reference signals that have a QCL relationship and a QCL type associated with the SSB.

18. The apparatus of claim 16, wherein the instructions to receive the signaling further are executable by the processor to cause the apparatus to:

identify that an SSB index of the SSB corresponds to a first control channel monitoring occasion of a plurality of control channel monitoring occasions; and monitor a common search space of the first control channel monitoring occasion for the control information.

19. The apparatus of claim 16, wherein the SSB has a QCL relationship with a reference signal of the indicated TCI state.

20. The apparatus of claim 16, wherein the instructions are further executable by the processor to cause the apparatus to:

transmit a capability indicator that indicates a defined number of active TCI states; and receive configuration signaling indicating a defined number of QCL assumptions for at least one physical downlink shared channel (PDSCH) and at least one coreset for a bandwidth part based at least in part on transmitting the capability indicator.

21. The apparatus of claim 20, wherein the defined number of QCL assumptions active for the UE is less than or equal to the defined number of active TCI states.

22. The apparatus of claim 16, wherein the instructions to determine the spatial parameters further are executable by the processor to cause the apparatus to:

determine that the identified QCL assumption is ready to be applied a defined number of transmission time intervals after receiving a response from a base station in the random-access procedure.

23. The apparatus of claim 16, wherein the TCI state corresponding to the initial coreset is one of a set of TCI states configured in a physical downlink shared channel (PDSCH) configuration information element.

24. An apparatus for wireless communication by a base station, comprising: a processor, memory in electronic communication with the processor; and instructions stored in the memory and executable by the processor to cause the apparatus to:

transmit signaling indicating a transmission configuration indication (TCI) state corresponding to an initial control resource set (coreset);

identify a quasi co-location (QCL) assumption associated with a synchronization signal block (SSB) selected in a random-access procedure, wherein the SSB is selected through the random-access procedure not initiated by a physical downlink control channel (PDCCH) order that triggers a non-contention based random-access procedure;

determine spatial parameters for the initial coreset for control information using the indicated TCI state or the identified QCL assumption based at least in part on whether the indicated TCI state is to be applied is more recent than a second time at which the identified QCL assumption; and transmit the control information via the initial coreset based at least in part on the determined spatial parameters.

25. The apparatus of claim 24, wherein the TCI state indicates a configuration of first and second reference signals that have a QCL relationship and a QCL type associated with the SSB.

26. The apparatus of claim 24, wherein the instructions to transmit the control information further are executable by the processor to cause the apparatus to:

transmit the control information in a first control channel monitoring occasion of a plurality of control channel monitoring occasions, wherein a location of the first control channel monitoring occasion within a common search space of a control channel corresponding to the initial coreset is based at least in part on an SSB index of the SSB.

27. The apparatus of claim 24, wherein the SSB has a QCL relationship with a reference signal of the indicated TCI state.

28. The apparatus of claim 24, wherein the instructions are further executable by the processor to cause the apparatus to:

receive a capability indicator that indicates a defined number of active TCI states; and transmit configuration signaling indicating a defined number of QCL assumptions for at least one physical downlink shared channel (PDSCH) and at least one coreset for a bandwidth part based at least in part on receiving the capability indicator.

* * * * *